(12) United States Patent
DiMarco

(10) Patent No.: US 6,571,557 B2
(45) Date of Patent: Jun. 3, 2003

(54) ENGINE CYLINDER HEAD

(75) Inventor: Steven L. DiMarco, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/826,787

(22) Filed: Apr. 5, 2001

(65) Prior Publication Data
US 2002/0073704 A1 Jun. 20, 2002

Related U.S. Application Data

(60) Provisional application No. 60/195,710, filed on Apr. 7, 2000.

(51) Int. Cl.[7] ................................................ F02B 33/44
(52) U.S. Cl. ........................ 60/598; 123/559.1; 123/565
(58) Field of Search .............................. 60/605.1, 598; 123/559.1, 565

(56) References Cited

U.S. PATENT DOCUMENTS 5,003,942 A * 4/1991 Hansard ...................... 60/598
5,540,054 A * 7/1996 Bullivant ..................... 60/598

* cited by examiner

Primary Examiner—Thomas Denion
Assistant Examiner—Thai-Ba Trieu
(74) Attorney, Agent, or Firm—Francis C. Hand; Carella, Byrne, et al.

(57) ABSTRACT

The engine head is provided with a compressor blade assembly in each intake port of each cylinder to compress the air introduced into the cylinder in order to supercharge the engine. A similar turbine blade assembly is provided in each exhaust port and is connected via a transmission to an adjacent compresssor blade assembly to drive the same.

14 Claims, 8 Drawing Sheets

ENGINE CYLINDER HEAD

This application claims the benefit of Provisional Application No. 60/195,710 filed Apr. 7, 2000.

This invention relates to an engine cylinder head. More particularly, this invention relates to an engine cylinder head for an internal combustion engine. Still more particularly, this invention relates to an internal turbocharger for a cylinder of an internal combustion engine.

BACKGROUND

A supercharger (or blower) is an externally mounted device that has the capability of increasing the power output of an internal combustion engine and consists mainly of an air compressor (typically belt-driven) that forces intake charge into the cylinders of an engine—which leads to an increase in volumetric efficiency. A supercharger uses power directly from the engine itself to power a compressor. This makes a supercharger a particularly inefficient device, and is one the main reason for its limited popularity. Another cause being that there are many extra external components and modifications required with the use of this device (e.g. intake manifold, pulleys, oil lines, etc.).

A turbocharger (or turbo) is an externally mounted, exhaust-driven supercharger. A typical increase in power provided by a turbo is on the order of 40% (for stock vehicles), yet five fold increases in horsepower (for race cars) have actually been achieved by the addition of this device. The turbocharger (unlike the supercharger) uses the normally wasted heat energy in the exhaust gases of an engine to drive a turbine, which in turn drives a compressor. This makes the turbo a more efficient device than a belt driven supercharger.

Turbos have been used since the early 1900's, to maximize the efficiency of all types of internal combustion engines. In the late 1980's, turbocharger usage in the auto industry was at an all-time high. Virtually every automobile company was incorporating turbocharger technology. Consumers were buying turbo cars at an astronomical rate and paying an average $5,000 for this option. This additional cost was easily justified to the consumer by the dramatic increase in the power and efficiency of their automobile engines. The turbo craze was in full effect and turbocharger popularity had suddenly reached epidemic proportions. However, the problems associated with this poorly designed, hundred-year old device would eventually become apparent. Short turbo life, overcrowded engine compartments, and turbo lag were just some of the reasons. Many attempts to resolve these problems proved futile. By the mid 1990's turbocharger drawbacks were discussed more often than their benefits; by 1999, commercial usage of the turbo was nearly eradicated.

For example, U.S. Pat. No. 5,535,715 uses a geared reciprocating engine to invoke the spherical rotary valve. This concept of geared apparatus applies the geared impellers, and is invoked by means of the exhaust gas.

U.S. Pat. No. 4,010,727 uses a spiral groove in a valve housing to enhance oil lubrication of the valve. This concept is applied to the lubrication of the valve stem by honing the inside surface of the valve guide.

U.S. Pat. No. 4,777,917 uses supercharger cylinders aligned axially with power cylinders and attached by a rod to the piston and feeds air at high pressure and high speed to the cylinder which, in turn, increases the rate of charge consumption.

U.S. Pat. No. 4,735,178 uses a passage between an exhaust manifold and a turbo-supercharger, and then another passageway between the turbo-supercharger and an intake manifold. With a predetermined capacity in the passage, it is possible to dampen the "pulsing phenomenon".

U.S. Pat. No. 3,896,781 has pre-combustion chambers associated with each combustion cylinder and dual rotary valves. One valve controls a lean mixture into the pre-combustion chamber and the other controls a rich mixture into the combustion chamber and the flow of exhaust gases out of the chamber. The valve shafts are geared together and are driven by a crankshaft at a give speed.

Turbochargers are also notorious for bearing failure. Conventional turbos are externally mounted, and usually relatively far from the oil environment of the engine. Their bearings are externally lubricated by long feed lines, which are tapped onto the engine oil pressure fitting. As a result, occurrences of oil starvation are often experienced (especially at engine start-up).

Accordingly, it is an object of the invention to improve the efficiency of an internal combustion engine.

It is another object of the invention to efficiently recover energy from the waste combustion gases of an internal combustion engine.

It is another object of the invention to provide a relatively simple structure for improving the efficiency of an internal combustion engine.

It is another object of the invention to provide a structure which has the benefits of a turbocharger while excluding the major drawbacks of a turbocharger.

BRIEF DESCRIPTION OF INVENTION

Briefly, the invention provides an engine cylinder head for an internal combustion engine that incorporates an internal turbocharger within each pair of intake/exhaust ports.

The engine cylinder head is constructed with at least one cylinder, an intake port for delivering air to the cylinder, and an exhaust port for exhausting combusted gas from the cylinder. In addition, as is conventional, a valve is reciprocally mounted in the intake port for selectively opening and closing the intake port relative to the cylinder and a valve is reciprocally mounted in the exhaust port for selectively opening and closing the exhaust port relative to the cylinder.

In accordance with the invention, a turbine blade assembly is mounted on the valve within the exhaust port for rotation thereof in response to passage of exhausted combustion gas thereover and is operatively coupled to a compressor blade assembly mounted on the valve within the intake port to drive the compressor blade assembly to compress air in the intake port.

The cylinder head functions as a component in an upper section of the internal combustion engine and is essentially a one-piece block of metal (typically, either cast iron or aluminum) that houses all the engine intake/exhaust valves and ports. One of the most important functions of an engine head is to provide a mechanically valved path for engine airflow.

Until now, engine cylinder heads were only passive, meaning that they only provided a pathway for engine airflow. They never actually generated or even promoted airflow. In fact, conventional engine cylinder heads always caused impedance in engine airflow regardless of how well they were designed. The present head, however, is an active device and will always act to increase engine airflow. The head is an ingeniously designed engine head that utilizes exhaust-driven superchargers within its ports.

The compressor and turbine blade assemblies of the cylinder head are located in the intake and exhaust ports respectively, where they belong. Both blades assemblies are coupled via a transmission in the form of a gear cluster that is located in an engine valve cover region. This oil-saturated environment ensures proper lubrication of the gears and rotating drive shafts.

The engine head, in effect, houses a plurality of tiny, internal turbochargers (one per engine cylinder). This allows for tuned supercharging; each cylinder is responsible for its own volumetric efficiency. Also, by using a series of low inertia turbos instead of one large turbo (as in conventional systems), turbo lag becomes virtually non-existent, and a dramatic increase in throttle response is realized as a result. The supercharging mechanism in the engine head is completely self-contained—unlike turbo systems that require many extra external components, some of which are very costly.

Externally, the engine head is virtually identical to a stock engine head. This allows the use of all original externals (intake manifold, exhaust manifold, etc.). The engine head, as a turbocharger, has the ability to increase engine performance and efficiency without using power from the crankshaft, as is the case with a supercharger.

These and other objects and advantages will become more apparent from the following detailed description taken in conjunction with the accompanying drawings wherein.

DETAILED DESCRIPTION

Figure 1:
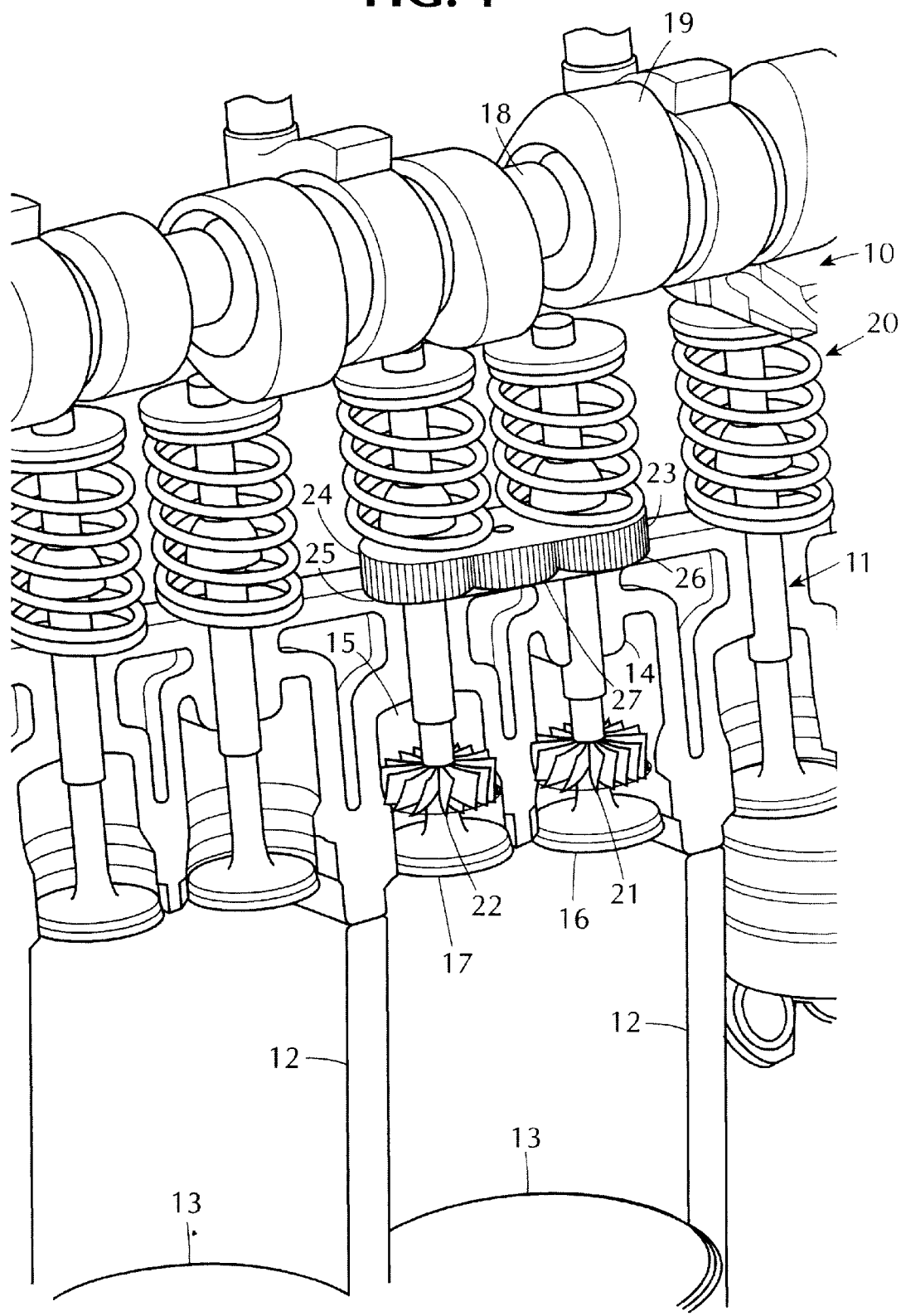
FIG. 1 illustrates a perspective view of an engine head constructed in accordance with the invention.

Referring to FIG. 1, an internal combustion engine 10 has an engine cylinder head 11, for example of one-piece construction, with a plurality of cylinders 12, each of which has a piston 13 reciprocally mounted therein.

As is conventional, each cylinder 12 communicates with an intake port 14 in the cylinder head 11 for delivering air to the cylinder 12 as well as an exhaust port 15 in the cylinder head 11 for exhausting combusted gas from the cylinder 12. In addition, a valve 16 is reciprocally mounted in the intake port 14 for selectively opening and closing the intake port 14 relative to the cylinder 12 and a valve 17 is reciprocally mounted in the exhaust port 15 for selectively opening and closing the exhaust port 15 relative to the cylinder 12.

As shown, the valves 16, 17 are reciprocated in a conventional manner by a cam shaft 18 having cams 19 that drive that move the individual valves 16, 17 against the bias of a spring 20.

In accordance with the invention, an axial compressor blade assembly 21 is located in the intake port 14 of each cylinder 12 for compressing air in the intake port 14 and an axial turbine blade assembly 22 is located in the exhaust port 15 of each cylinder 12 for rotation in response to the passage of exhausted combustion gas thereover. For the sake of simplicity, only one cylinder 12 is shown with the blade assemblies 21, 22. In addition, a transmission 23 operatively connects the blade assemblies 21, 22 together such that the turbine blade assembly 22 is operatively coupled to the compressor blade assembly 21 to drive the compressor blade assembly 21 to compress air in the intake port 14.

The transmission 23 includes an open framed chassis 24 mounted on the cylinder head 11 with a gear cluster therein. This gear cluster includes a first drive gear 25 connected to said turbine blade assembly 22 for rotation therewith, a second drive gear 26 connected to the compressor blade assembly 21 for rotation therewith and a linking gear 27 meshing with the drive gears 25, 26 to transfer a rotation of the first drive gear 25 to the second drive gear 26.

Figure 2:
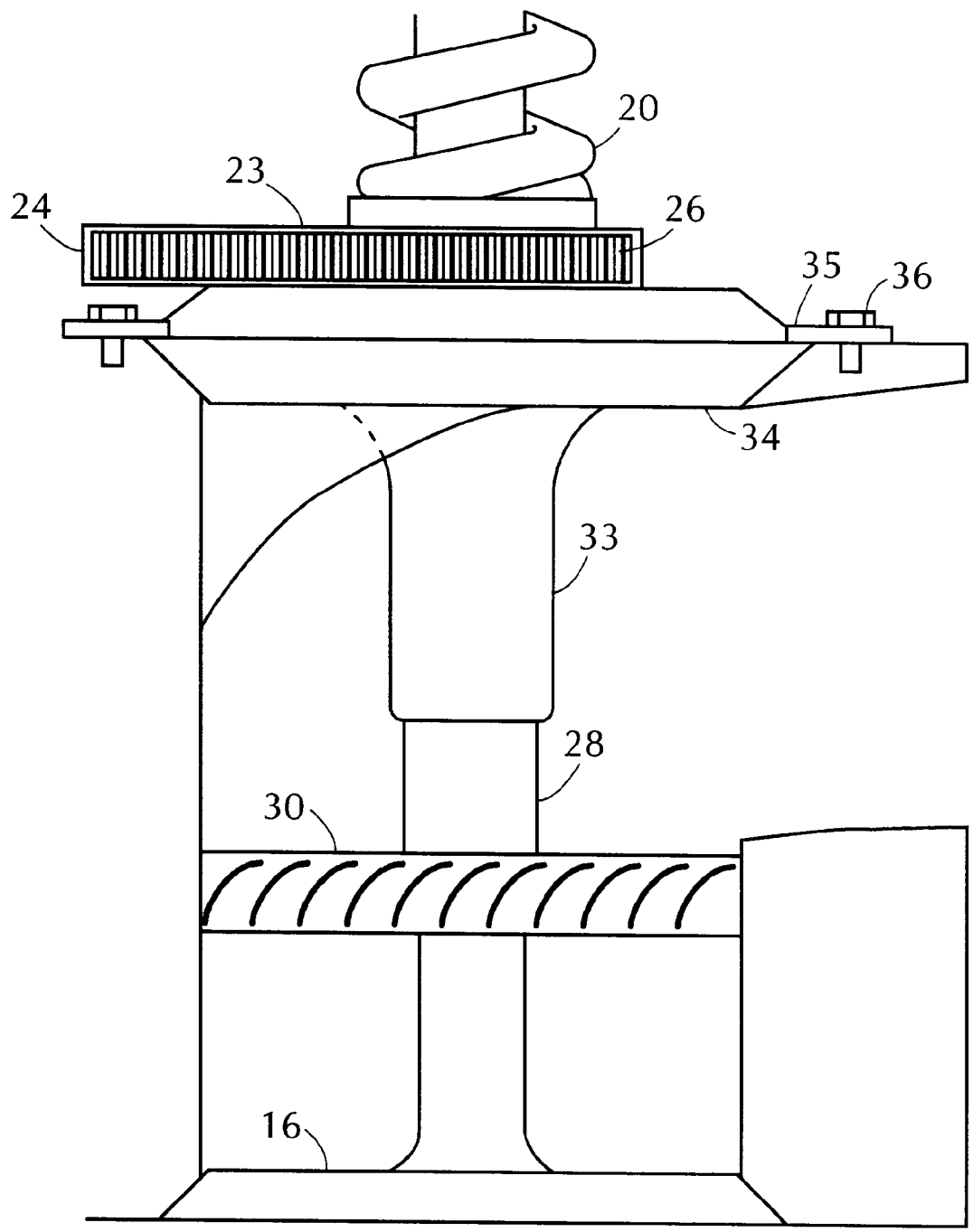
FIG. 2 illustrates a view of a blade assembly that is removably mounted in the cylinder head in accordance with the invention.

Referring to FIG. 2, the compressor blade assembly 21 includes a hollow shaft 28 that is slidably mounted on a stem of the valve 16 to allow the valve 16 to reciprocate therein. This shaft 28 has a splined upper end 29, as viewed, (see FIG. 3) that is connected to the drive gear 26 of the transmission 23 for rotation therewith. A plurality of blades 30 are connected to a lower end of the shaft 28 to form a compressor wheel and are disposed in the intake port 14.

Figure 3:
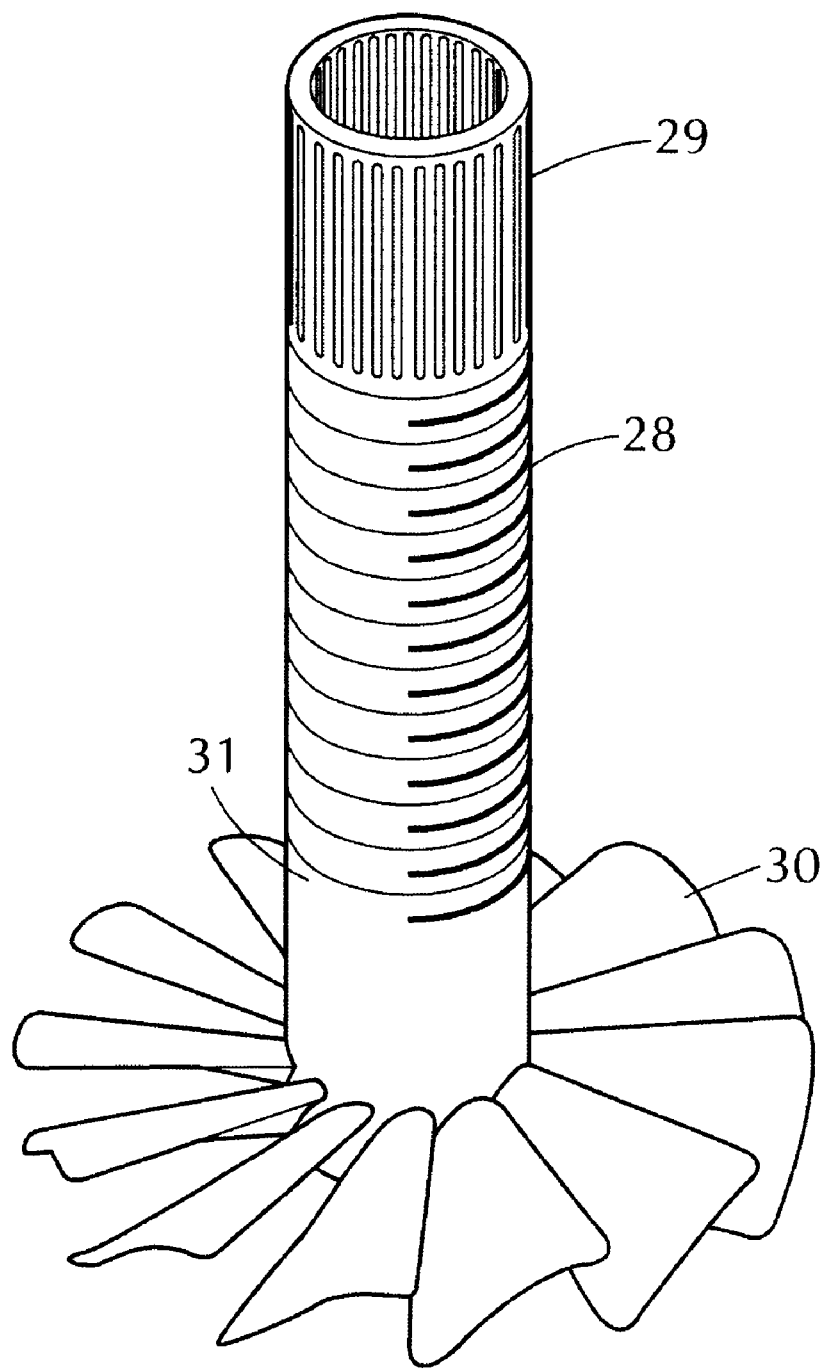
FIG. 3 illustrates a perspective view of a compressor blade assembly constructed in accordance with the invention.

Referring to FIG. 3, the shaft 28 of the compressor blade assembly has a rifling 31 thereon for directing lubricating oil therealong towards the drive gear 26.

Figure 4:
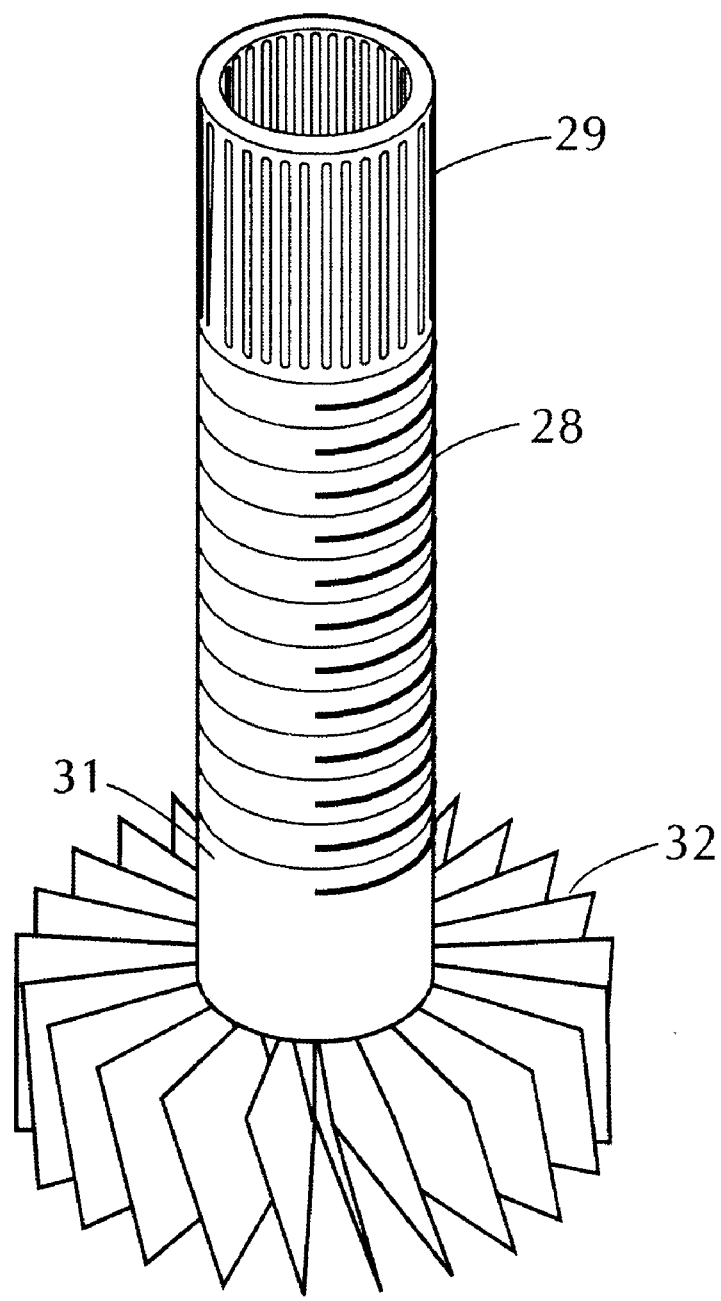
FIG. 4 illustrates a perspective view of a turbine blade assembly constructed in accordance with the invention.

Referring to FIG. 4, wherein like reference characters indicate like parts as above, the turbine blade assembly 22 is constructed in the same manner as the compressor blade assembly 21 except for having turbine blades 32 disposed on the shaft 28.

Referring to FIG. 2, the shaft 28 of the compressor blade assembly 21 is rotatably mounted in a sleeve or guide 33 that is, in turn, fixedly mounted in the cylinder head 11. As shown, the guide 33 is fitted from above into an aperture 34 in the head 11 and is held in place by a pair of plates 35 which are secured to the head 11 by bolts 36 or the like. As such, the guide 33 and compressor blade assembly 21 may be replaced by lifting out of the head 11 without removal of the head 11. Each guide 33 may be provided with oil channels to provide lubrication to the rotating shaft 28 of a blade assembly 21, 22.

In operation, the turbine blade assembly 22 is caused to rotate by hot exhaust gases flowing through the exhaust port 15. The rotational motion of the turbine blade assembly 22 is transferred via the hollow shaft 28 to the drive gear 25 located in the valve cover region and, thence, via the drive gear 26 to the shaft 28 of the compressor blade assembly 21 to drive the compressor blade assembly 21.

A specific compressor/turbine rotational speed ratio can be achieved by the use of unequal drive gear diameters in the transmission 23.

Roller bearings or ball bearings may be also used to rotatably mount a shaft 28 in a guide 22. If used, the bearings would be suited within the guides 33.

Referring to FIG. 1, the linear sections of the intake ports 14 and exhaust ports 15 coaxial to the valve stems are longer than in conventional heads to provide sufficient volume for pre-cylinder compression of the intake charge.

Figure 5:
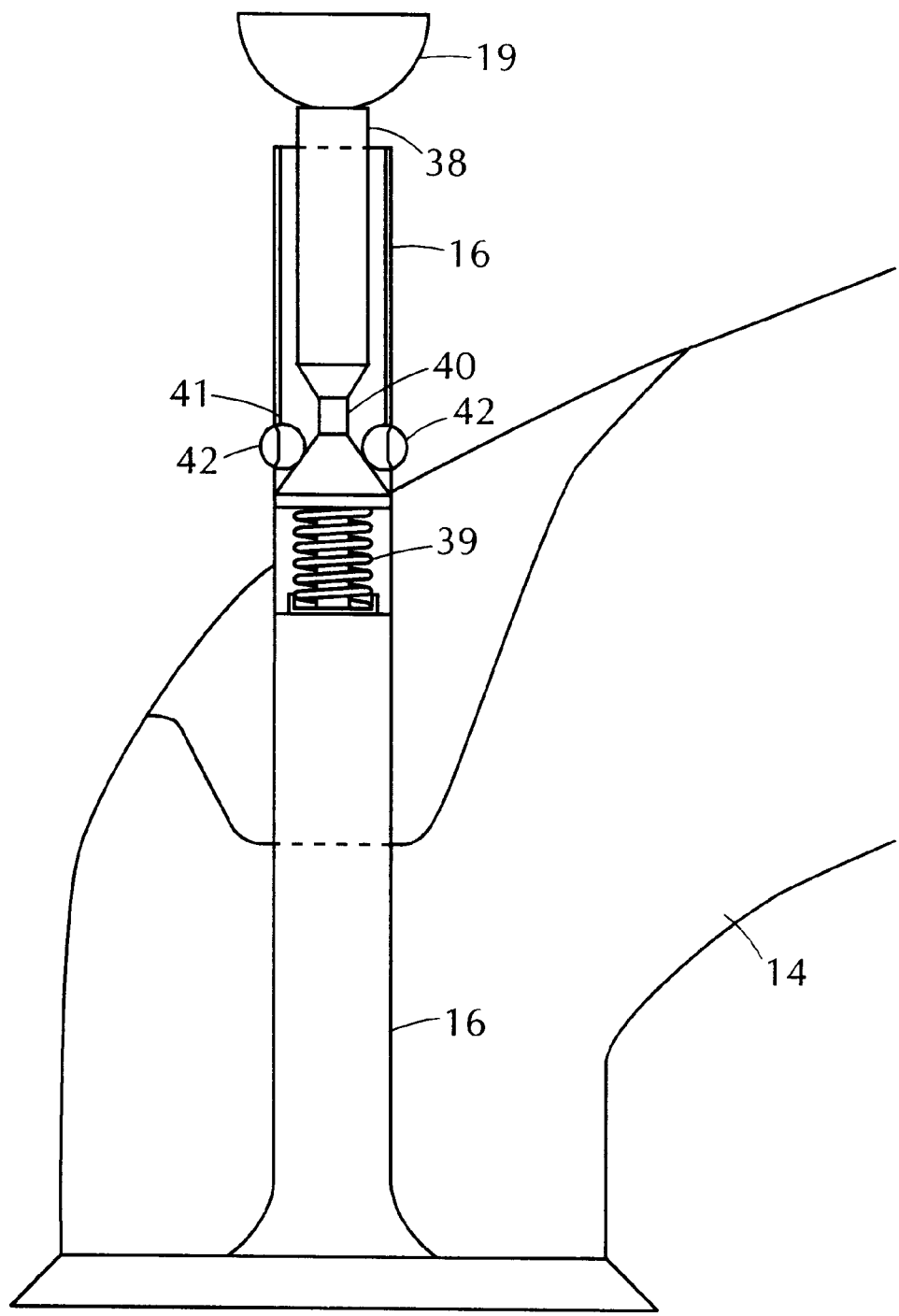
FIG. 5 illustrates a modified mounting arrangement for a blade assembly in accordance with the invention.

Referring to FIG. 5, the valves 16, 17 may or may not incorporate a valve locking mechanism 37 to keep the valves 16, 17 sealed under boost conditions. For example, the stem of a valve 16, 17 may be provided with a hollow upper section into which an actuator 38 is telescopically mounted on top of a spring 39. In addition, the actuator 38 is provided with a restricted section 40 in an area of the stem that is provided with slots 41. Ball bearings 42 are disposed between the restricted section of the actuator and the slots 41.

In use, a cam 19 of the cam shaft (not shown) biases the actuator 38 into the hollowed stem of the valve 16 against the spring 39. As the actuator 38 moves downwardly, as viewed, the ball bearings 42 which are otherwise in a protruding position as shown move inwardly into the restricted section 40 and, thus, within the plane of the actuator 38. At this point, the bearings 42 no longer impede the axial motion of the valve stem 16. As the valve stem 16 returns to the upper position, the spring 39 biases the actuator 38 out of the hollowed end of the valve stem 16. Th lower conical part of the actuator 38 then biases the ball bearings 42 outwardly into the position shown to prevent axial motion of the valve 16 within the guide 33. Basically, air pressure against the valve face will not be able to force the valve 16 open prematurely.

Figure 6:
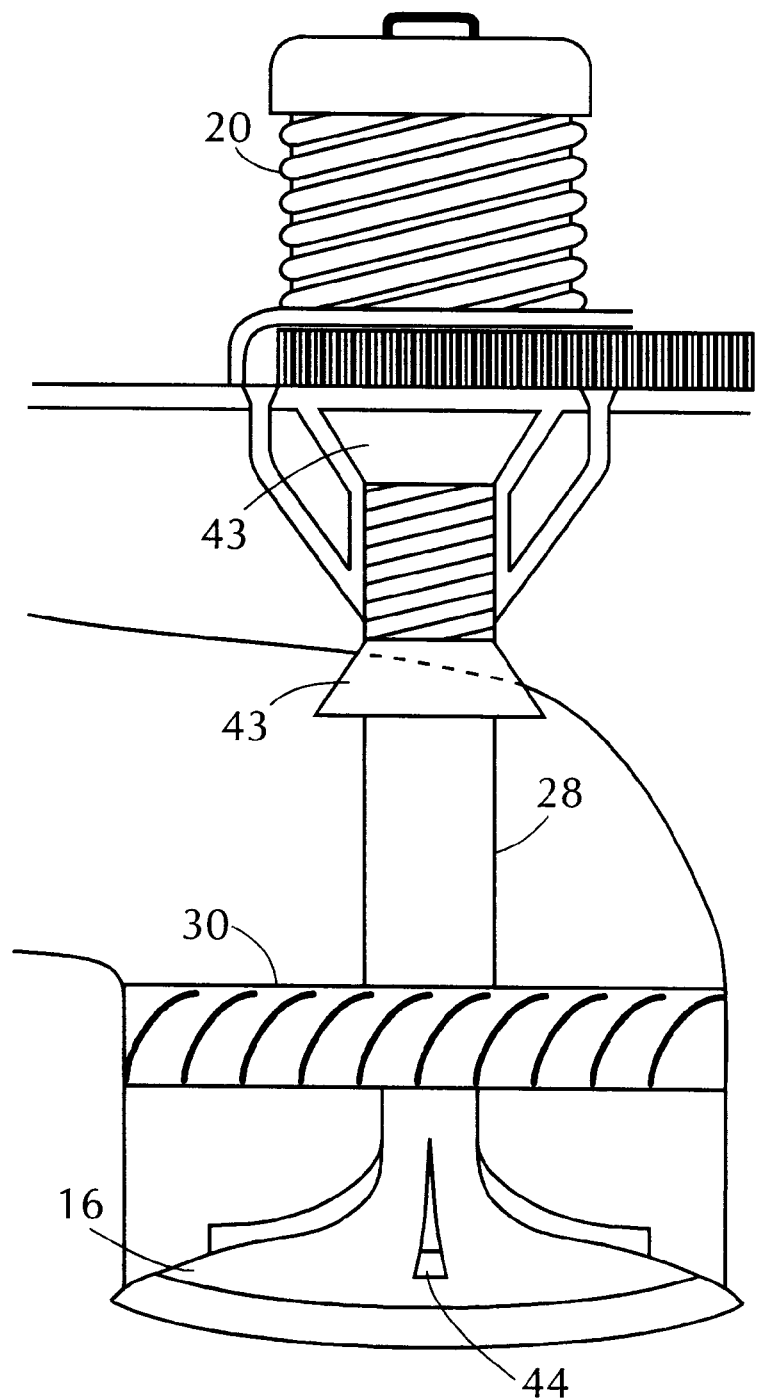
FIG. 6 illustrates a further modified mounting arrangement for a blade assembly in accordance with the invention.

Referring to FIG. 6, wherein like reference characters indicate like parts as above, for high speed operation, a pair of flare fittings 43 may be mounted on and secured to the shaft 28 of the blade assembly 16, 17 for rotation therewith. These flare fittings 43 are disposed above and below the part of the cylinder head 11 through which the shaft 28 passes and serve to deal with thrust loading.

As shown, the valve 16 may be provided with flow straighteners in the form of projections 44 on the upper flow surfaces.

Referring to FIG. 1, during use, as a piston 13 rises in a cylinder 12, the piston 13 forces hot exhaust gases past the open exhaust valve 17. The turbine blade shaft 28 spools up and approaches maximum RPM and is maintained there by the near-constant exhaust pressure flowing through the turbine blade assembly 22. The hollow turbine shaft 28 directs the rotational energy of the turbine blades 32 up through the bushing 33 to the turbine drive gear 25 within the transmission 23. The turbine drive gear 25 then transfers its rotational motion to the linking gear(s) 27 within the transmission. The linking gear 27, in turn, translates its rotational motion to the compressor drive gear 26. The compressor drive gear 26 translates its rotational energy to the shaft 28 of the compressor blade assembly 21. The compressor blade assembly 21 spools up to maximum RPM as it compresses intake charge within the lengthened linear intake port 14. When the intake valve 16 opens, the pre-compressed charge is continually forced into the cylinder 12 until the intake valve 16 closes.

Increased engine horsepower and torque result from the combustion of a more robust intake charge.

The compressor blade assembly 21 may also be used alone to supercharge an engine, that is, without a turbine blade assembly 22. In this case, a small electric or gas motor or other means such as the engine crank power may be used to drive the compressor blade assembly 21.

Figure 7:
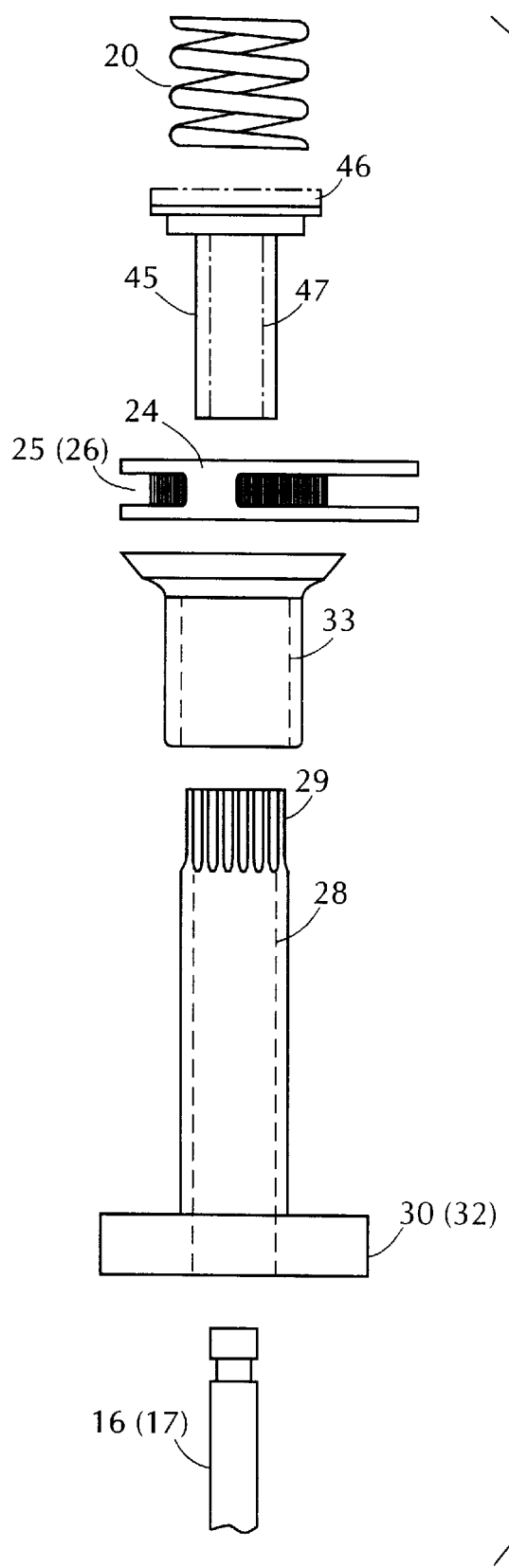
FIG. 7 illustrates an exploded view of a modified blade assembly constructed in accordance with the invention.

Referring to FIG. 7, wherein like reference characters indicate like parts as above, a hollow valve guide bushing 45 is concentrically mounted within each guide 33 with the hollow shaft 28 of the blade assembly 21, 22 rotatably mounted therebetween. The valve guide bushing 45 has a collar 46 that is secured to the chasssis 24 and a depending cylindrical portion 47 that extends through the drive gear 25, 26 into the guide 33 to receive the valve 16, 17 in slidable relation. The collar 46 of the bushing 45 is sized and recessed to allow the spring 20 to seat thereon.

Figure 8:
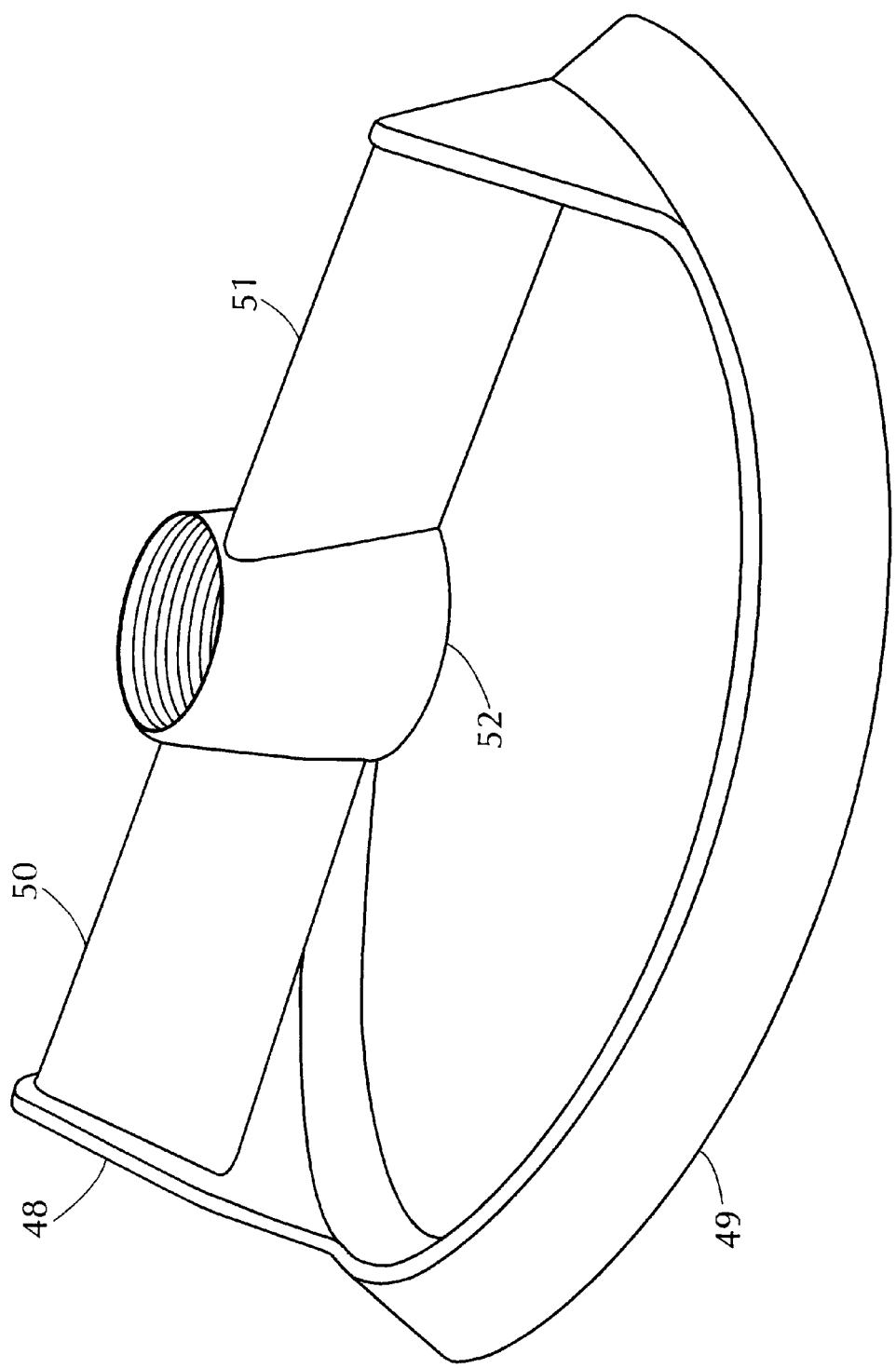
FIG. 8 illustrates a perspective view of a valve guide vane strut that may be used to effect a change in an air flow into or from a cylinder in accordance with the invention.

Referring to FIG. 8, a valve-guide vane strut 48 may be located in place of the existing valve seats of the exhaust port 22 and/or the intake for 21, below each rotating blade assembly 16, 17. Typically, the strut 48 would be pressed and/or bolted into the port valve seat area. The strut 48 acts as a stator to direct airflow—either into the turbine blade assembly (to introduce swirl) or out of the compressor blade assembly (to reduce swirl). A similar type valve guide vane strut that would be lodged into the port wall may be used above each blade assembly as well to introduce swirl into the blade compressor and/or to reduce swirl out of the blade compressor.

As shown, the strut 48 has an annular valve seat 49, a diametrically disposed pair of stator blades 50, 51 and a centrally disposed valve stem guide 52 through which the stem of a valve may be slidably guided. The two blades 50, 51 are angularly disposed to provide a swirl to the airflow passing thereover as explained above.

The valve guide vane strut 48 may also be used in the intake port of a conventional type cylinder head to significantly enhance combustion and airflow characteristics (i.e. swirl). The orientation of the stator blades 50, 51 of the valve guide vane strut 48 can be chosen for specific combustion results and for a particular engine application. For example, a truck engine may need more tumble of the airflow into the combustion chamber, so both stator blades 50, 51 will be pitched in the same direction across the diameter of the port. Similarly, a high performance sports car engine may require more swirl of the airflow into the combustion chamber, so the two stator blades 50, 51 will be pitched in opposite directions across the diameter of the port. Also, the pitch angle can be chosen to satisfy a specific application (increasing the angle will have a greater effect). When used in conventional heads, a dramatic increase in valve stability will be realized because the valve is supported within the guide along its centered position, further down the port. This allows a head to be cast without the obstruction of the valve guide boss, which is necessary in conventional heads for valve support and stability. The removal of the valve guide vane strut 48 will dramatically increase engine airflow by causing a large increase in the intake port's cross sectional area (at the bend of the port where it is most crucial).

The invention thus provides an engine cylinder head which is able to increase the efficiency of an internal combustion engine. Further, the engine head is able to efficiently recover energy from the waste combustion gases of an internal combustion engine.

The invention also provides a relatively simple structure for improving the efficiency of an internal combustion engine that has the benefits of a turbocharger while excluding the major drawbacks of a turbocharger.

What is claimed is:

1. An engine head for a charged internal combustion engine having at least one cylinder comprising:

at least one cylinder;

an intake port for delivering air to said cylinder;

an exhaust port for exhausting combusted gas from said cylinder;

a first valve reciprocally mounted in said intake port for selectively opening and closing said intake port relative to said cylinder;

a second valve reciprocally mounted in said exhaust port for selectively opening and closing said exhaust port relative to said cylinder;

a compressor blade assembly mounted on said first valve within said intake port for compressing air therein; and a turbine blade assembly mounted on said second valve within said exhaust port for rotation thereof in response to passage of exhausted combustion gas thereover, said turbine blade assembly being operatively coupled to said compressor blade assembly to drive said compressor blade assembly to compress air in said intake port.

2. The engine head as set forth in claim 1 which further comprises a transmission operatively connecting said blade assemblies together.

3. The engine head as set forth in claim 2 wherein said transmission includes an open framed chassis mounted on said cylinder head, a first drive gear connected to said turbine blade assembly for rotation therewith, a second drive gear connected to said compressor blade assembly for rotation therewith and a linking gear meshing with said drive gears to transfer a rotation of said first drive gear to said second drive gear.

4. The engine head as set forth in claim 3 wherein said compressor blade assembly includes a hollow shaft slidably mounted on said first valve and having a splined end connected to said second drive gear for rotation therewith and a plurality of blades connected to said shaft and disposed in said intake port.

5. The engine head as set forth in claim 4 wherein said turbine blade assembly includes a hollow shaft slidably mounted on said second valve and having a splined end connected to said first drive gear for rotation therewith and a plurality of blades connected to said shaft and disposed in said exhaust port.

6. The engine head as set forth in claim 5 wherein each said shaft has rifling thereon for directing lubricating oil therealong towards a respective drive gear.

7. The engine head as set forth in claim 4 which further comprises a fixedly mounted guide therein having said shaft of said compressor blade assembly rotatably mounted therein.

8. The engine head as set forth in claim 7 which further comprises a hollow valve guide bushing concentrically within said guide with said hollow shaft of said blade assembly rotatably mounted therebetween.

9. The engine head as set forth in claim 8 wherein said valve guide is secured to said chasssis.

10. An engine head for an internal combustion engine comprising at least one cylinder;

an intake port for delivering air to said cylinder;

a valve reciprocally mounted in said intake port for selectively opening and closing said intake port relative to said cylinder;

a compressor blade assembly mounted on said valve within said intake port for compressing air therein; and means for driving said compressor blade assembly to compress air in said intake port.

11. The engine head as set forth in claim 10 wherein said compressor blade assembly includes a hollow shaft slidably mounted on said valve and a plurality of blades connected to said shaft and disposed in said intake port.

12. The engine head as set forth in claim 11 wherein said means includes a transmission having a rotatably mounted drive gear and wherein said shaft of said blade assembly has a splined end connected to said drive gear for rotation therewith.

13. The engine head as set forth in claim 11 which further comprises a fixedly mounted guide therein having said shaft of said compressor blade assembly rotatably mounted therein.

14. The engine head as set forth in claim 13 which further comprises a hollow valve guide bushing concentrically within said guide with said hollow shaft of said blade assembly rotatably mounted therebetween.

\* \* \* \* \*